US012573354B2

(12) United States Patent \
Morioka

(10) Patent No.: US 12,573,354 B2 \
(45) Date of Patent: Mar. 10, 2026

(54) DIMMING DEVICE, AND DISPLAY SYSTEM

(71) Applicant: Panasonic Automotive Systems Co., Ltd., Kanagawa (JP)

(72) Inventor: Yusuke Morioka, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/016,647

(22) Filed: Jan. 10, 2025

(65) Prior Publication Data

US 2025/0308483 A1 Oct. 2, 2025

(30) Foreign Application Priority Data

Mar. 29, 2024 (JP) ................................. 2024-057160

(51) Int. Cl.
*G09G 5/10* (2006.01)
*G06F 3/01* (2006.01)

(52) U.S. Cl.
CPC .............. *G09G 5/10* (2013.01); *G06F 3/017* (2013.01); *G09G 2320/0606* (2013.01); *G09G 2320/066* (2013.01); *G09G 2320/0686* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 11,705,078 B1 * | 7/2023 | Chung | ..................... | G09G 5/10 |
| | | | | 345/204 |
| 2017/0053610 A1 * | 2/2017 | Yang | ..................... | G09G 3/3611 |
| 2017/0243406 A1 * | 8/2017 | Yamazaki | ............... | G06T 19/20 |
| 2021/0364793 A1 | 11/2021 | Fujiwara et al. | | |
| 2022/0004002 A1 | 1/2022 | Takahashi et al. | | |

FOREIGN PATENT DOCUMENTS

| | | |
|---|---|---|
| JP | 7338146 | 9/2023 |
| WO | 2021/234981 | 11/2021 |

\* cited by examiner

*Primary Examiner* — Aneeta Yodichkas \
(74) *Attorney, Agent, or Firm* — Greenblum & Bernstein, P.L.C.

(57) ABSTRACT

A dimming device according the present disclosure includes a dimming film, and a controller. In the dimming film, a plurality of grids are two-dimensionally arranged. In the memory, a program is stored. The controller is configured to set two or more grids among the plurality of grids to a dimming on state. The controller is configured to, when changing a pattern of the dimming on state according to a request, temporarily set at least some grids of the two or more grids to a dimming off state in middle of the changing.

10 Claims, 16 Drawing Sheets

DIMMING DEVICE, AND DISPLAY SYSTEM

CROSS-REFERENCE TO RELATED APPLICATIONS

This application is based upon and claims the benefit of priority from Japanese Patent Application No. 2024-057160, filed on Mar. 29, 2024, the entire contents of which are incorporated herein by reference.

FIELD

The present disclosure relates to a dimming device, and a display system.

BACKGROUND

In a display system including a dimming device and a display device, while an image is displayed on the display device, external light from the back surface is transmitted or attenuated by the dimming device, so that the image can be easily viewed. In the display system, it is desired to improve display performance.

Related techniques are described in JP 7338146 B2 and WO 2021/234981 A.

The present disclosure provides a dimming device, and a display system suitable for improving display performance.

SUMMARY

A dimming device according the present disclosure includes a dimming film, and a controller. In the dimming film, a plurality of grids are two-dimensionally arranged. In the memory, a program is stored. The controller is configured to set two or more grids among the plurality of grids to a dimming on state. The controller is configured to, when changing a pattern of the dimming on state according to a request, temporarily set at least some grids of the two or more grids to a dimming off state in middle of the changing.

BRIEF DESCRIPTION OF THE DRAWINGS

FIG. 12 is a view illustrating an operation at the time of a movement operation of a dimming device according to the first modification of the embodiment;

FIG. 13 is a view illustrating an operation at the time of an enlargement/shrinkage operation of the dimming device according to the first modification of the embodiment;

DETAILED DESCRIPTION

Hereinafter, an embodiment of a display system according to the present disclosure will be described with reference to the drawings.

EMBODIMENT

A display system according to the embodiment includes a dimming device and a display device, and while an image is displayed on the display device, external light from the back surface is transmitted or attenuated by the dimming device, so that the image can be easily viewed, and a device for improving display performance is provided.

Figure 1:
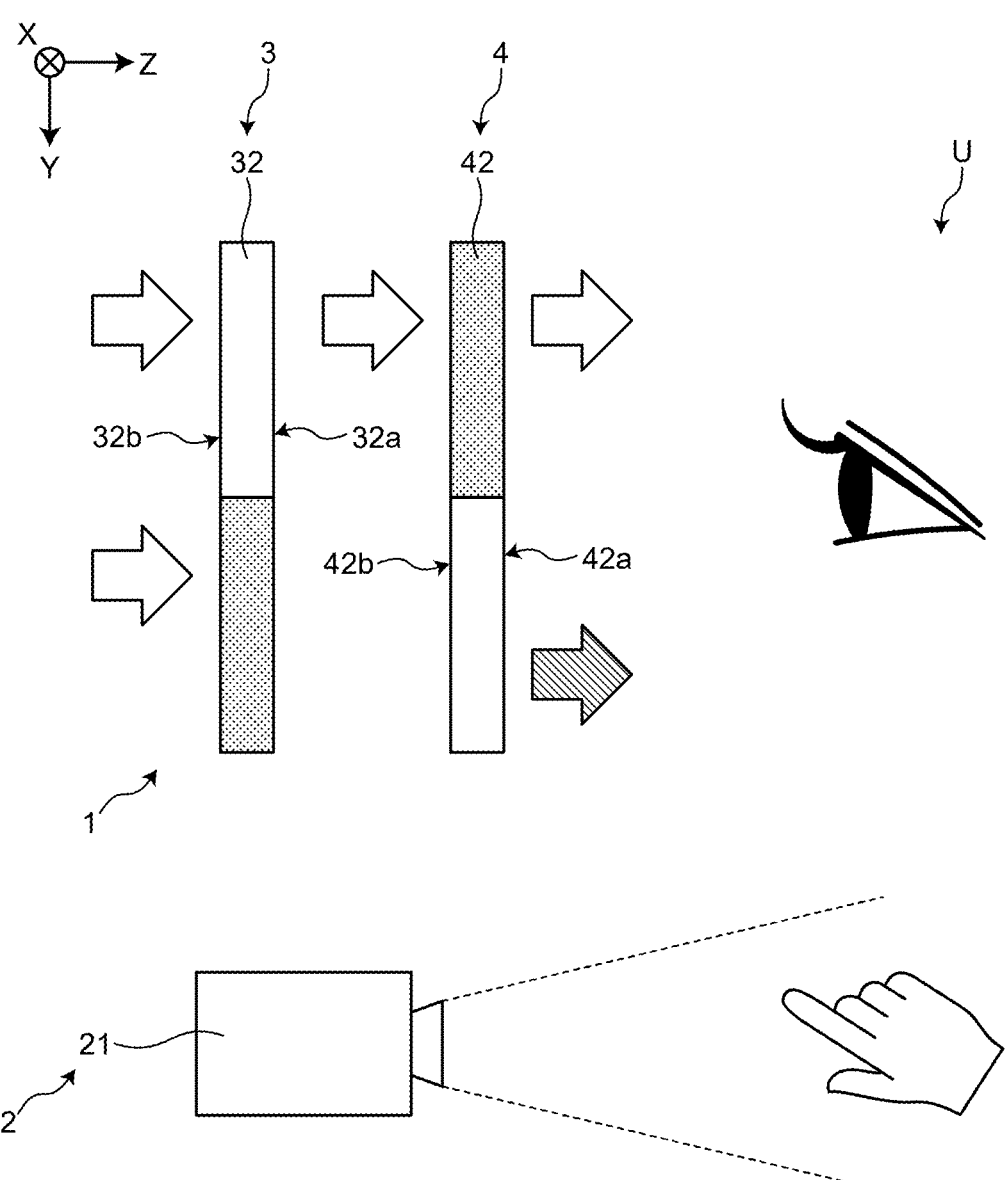
FIG. 1 is a cross-sectional view illustrating a schematic configuration of a display system according to an embodiment.

A display system 1 can be configured as illustrated in FIG. 1. FIG. 1 is a cross-sectional view illustrating a schematic configuration of the display system. The display system 1 includes a control device 2, a dimming device 3, and a display device 4. The control device 2 is communicably connected to each of the dimming device 3 and the display device 4.

The dimming device 3 includes a dimming film 32. The display device 4 includes a transparent display 42. Hereinafter, a direction perpendicular to a front surface 32a of the dimming film 32 is defined as a Z direction, a longitudinal direction of the dimming film 32 is defined as an X direction, and a lateral direction of the dimming film 32 is defined as a Y direction.

The dimming film 32 extends in a plate shape in the XY direction. The dimming film 32 is disposed on a -Z side of the transparent display 42. The dimming film 32 has the front surface 32a on a +Z side and a back surface 32b on the -Z side. The transparent display 42 extends in a plate shape in the XY direction. The transparent display 42 is disposed on the +Z side of the dimming film 32. The transparent display 42 has a front surface 42a on the +Z side and a back surface 42b on the -Z side. The transparent display 42 is disposed at a position where a user U can view the front surface 42a.

In the present specification, a state in which the dimming device 3 transmits the external light through the dimming film 32 is referred to as a dimming off state, and a state in which the dimming device 3 attenuates the external light through the dimming film 32 is referred to as a dimming on state. Attenuating the external light can also be referred to as shielding light. In addition, when a partial region of the dimming film 32 is in a state of transmitting the external light, it is referred to as a region in the dimming off state. Transmitting the external light can also be referred to as transmitting light. Similarly, when a partial region of the dimming film 32 is in a state of attenuating the external light, it is referred to as a region in the dimming on state.

In the present specification, a first element and a second element being "electrically connected" includes that a third element is interposed and connected between the first element and the second element to the extent that the functions of the first element and the second element are not hindered.

The control device 2 receives a request related to image display and dimming. The request may include designation of a two-dimensional position of a region to shield the light, or may include designation of a grid to be in the dimming on state. The control device 2 can control each of the dimming device 3 and the display device 4 according to a request.

The dimming device 3 can two-dimensionally perform dimming in which the external light from the back surface 32b is transmitted through the dimming film 32 or attenuated by the dimming film 32 under the control of the control device 2. In the dimming film 32, a plurality of grids are two-dimensionally arranged. Each grid is a unit region for changing the dimming on state and the dimming off state. Each grid may have a substantially rectangular shape in an XY plan view. In the dimming film 32, a plurality of grids may be arranged in a matrix in the X direction and the Y direction.

The display device 4 can display an image on the transparent display 42 or transmit the external light from the back surface 42b under the control of the control device 2. In the transparent display 42, unit regions having a transparent region and a light emitting region are two-dimensionally arranged. In each light emitting region, a plurality of light emitting pixels (for example, R pixel, G pixel, and B pixel) is disposed. In the R pixel, the G pixel, and the B pixel, emission colors correspond to red (R), green (G), and blue (B), respectively.

For example, as illustrated in a YZ cross-sectional view of FIG. 1, in the dimming film 32, a region on a +Y side is controlled to a light shielding state, and a region on a –Y side is controlled to a light transmitting state. At this time, in the transparent display 42, the back of the image displayed in the region on the +Y side is shielded by the dimming film 32, so that the image can be favorably viewed by the user in a state where the photopic contrast is improved. In addition, in the transparent display 42, when the image is not displayed or the image is displayed in black in the region on the –Y side, the background scene transmitted through the dimming film 32 is further transmitted through the transparent display 42 and can be favorably viewed by the user.

Figure 2:
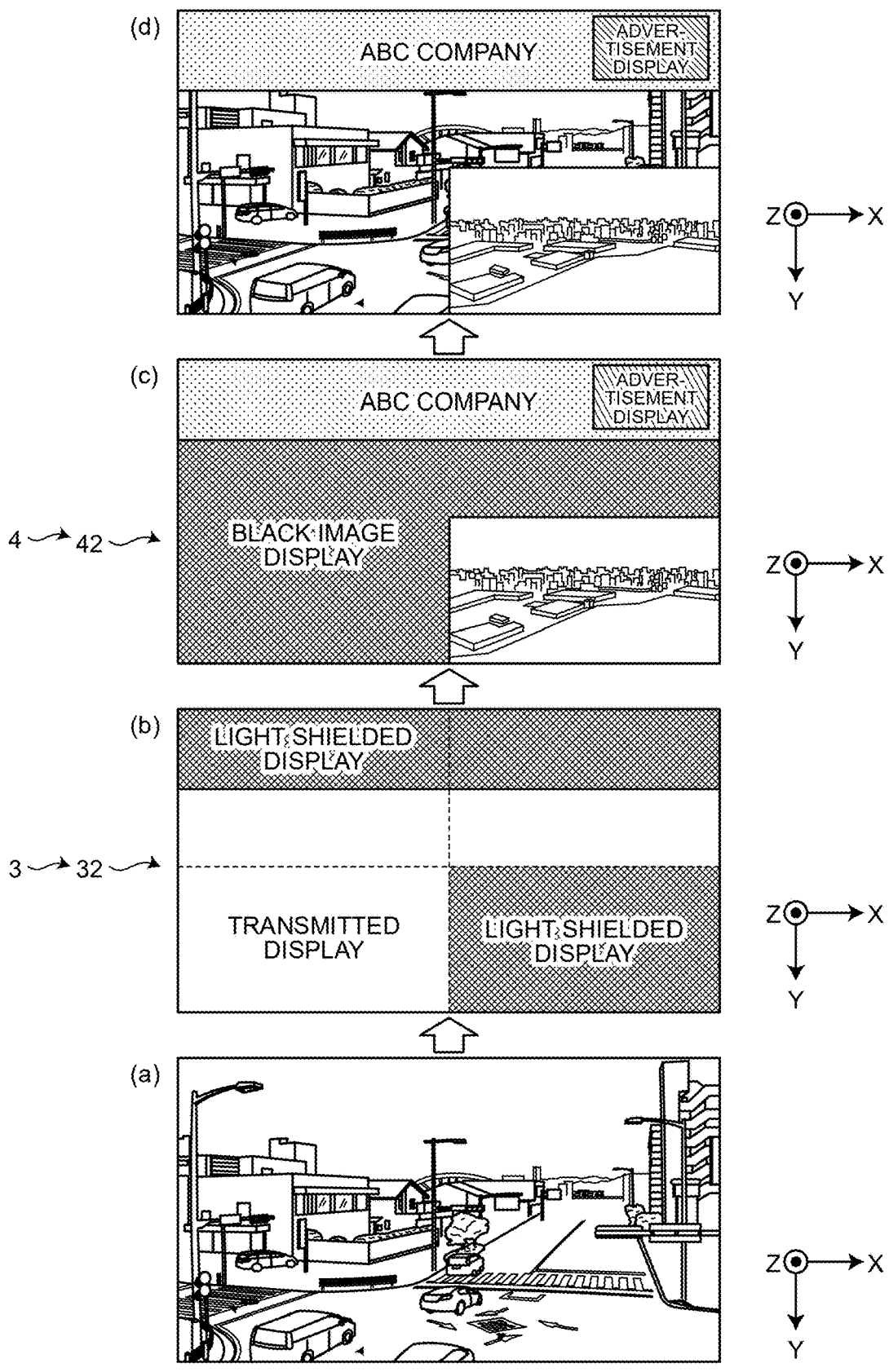
FIG. 2 is a plan view illustrating a schematic operation of the display system according to the embodiment.

Alternatively, it is assumed that the background illustrated at (a) in FIG. 2 exists behind the dimming film 32, and as illustrated in an XY plan view at (b) in FIG. 2, in the dimming film 32, the region on a +X side/+Y side and a Y width/4 region on the –Y side are controlled to the light shielding state. At this time, in the transparent display 42, the back of the image displayed in the region on the +X side/+Y side is shielded by the dimming film 32, so that the image can be favorably viewed by the user in a state where the photopic contrast is improved. In addition, in the transparent display 42, the back of advertisement display displayed in the Y width/4 region on the –Y side is shielded by the dimming film 32, so that the advertisement display can be favorably viewed by the user in a state where the photopic contrast is improved. In addition, in the other regions of the transparent display 42, when the image is not displayed or the image is displayed in black, the background scene transmitted through the dimming film 32 is further transmitted through the transparent display 42 and can be favorably viewed by the user.

Thus, image display and background through display can be performed favorably.

As illustrated in FIG. 1, the control device 2 may be capable of accepting a request by an aerial operation of the user U.

The aerial operation corresponds to performing the movement of a hand corresponding to a touch operation on a touch panel in the air. The aerial operation includes a click operation and a change operation. The click operation corresponds to touching the touch panel once. The change operation is an operation that causes a change in a target to be touched. The change operation includes a movement operation, an enlargement/shrinkage operation, and a rotation operation. The movement operation corresponds to a linear drag movement operation on the touch panel. The enlargement/shrinkage operation corresponds to a pinch-out operation or a pinch-in operation on the touch panel. The rotation operation corresponds to a curved drag movement operation on the touch panel.

Figure 3:
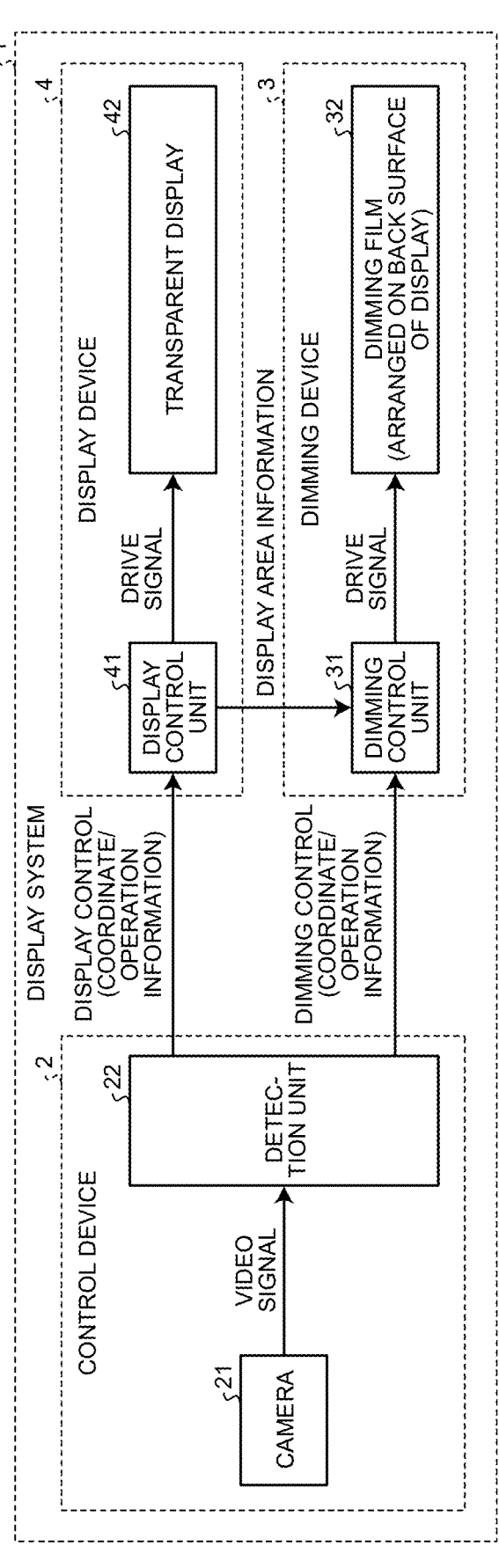
FIG. 3 is a block diagram illustrating a detailed configuration of the display system according to the embodiment.

In order to detect the aerial operation, the control device 2 may include a camera 21 and a detection unit 22 as illustrated in FIG. 3. FIG. 3 is a block diagram illustrating a detailed configuration of the display system 1.

The camera 21 is disposed at a position where the hand of the user U can be imaged (see FIG. 1). The control device 2 images the hand of the user U with the camera 21, and analyzes the request with the detection unit 22 according to the image of the hand of the user U. The detection unit 22 generates a display control signal and supplies the display control signal to the display device 4, and generates a dimming control signal and supplies the dimming control signal to the dimming device 3 according to the analysis result.

The dimming device 3 includes a dimming control unit (controller) 31 in addition to the dimming film 32. The dimming control unit 31 receives the dimming control signal from the control device 2, generates a drive signal according to the dimming control signal, and supplies the drive signal to the dimming film 32. The dimming film 32 is driven in accordance with the drive signal, and can shield the light in a designated region.

The display device 4 includes a display control unit 41 in addition to the transparent display 42. The display control unit 41 receives the display control signal from the control device 2, generates a drive signal according to the display control signal, and supplies the drive signal to the dimming film 32. The transparent display 42 is driven in accordance with the drive signal, and can display an image in a designated region.

Note that the resolution of the dimming film 32 may be lower than the resolution of the transparent display 42. The resolution of the dimming film 32 can be represented by a reciprocal of the dimension of the grid. The resolution of the transparent display 42 can be represented by a reciprocal of the dimension of the pixel.

Alternatively, the response speed of the dimming film 32 may be slower than the response speed of the transparent display 42. The response speed is a time from when the control device 2 instructs a change in position until the position changes by a unit change amount.

Figure 4:
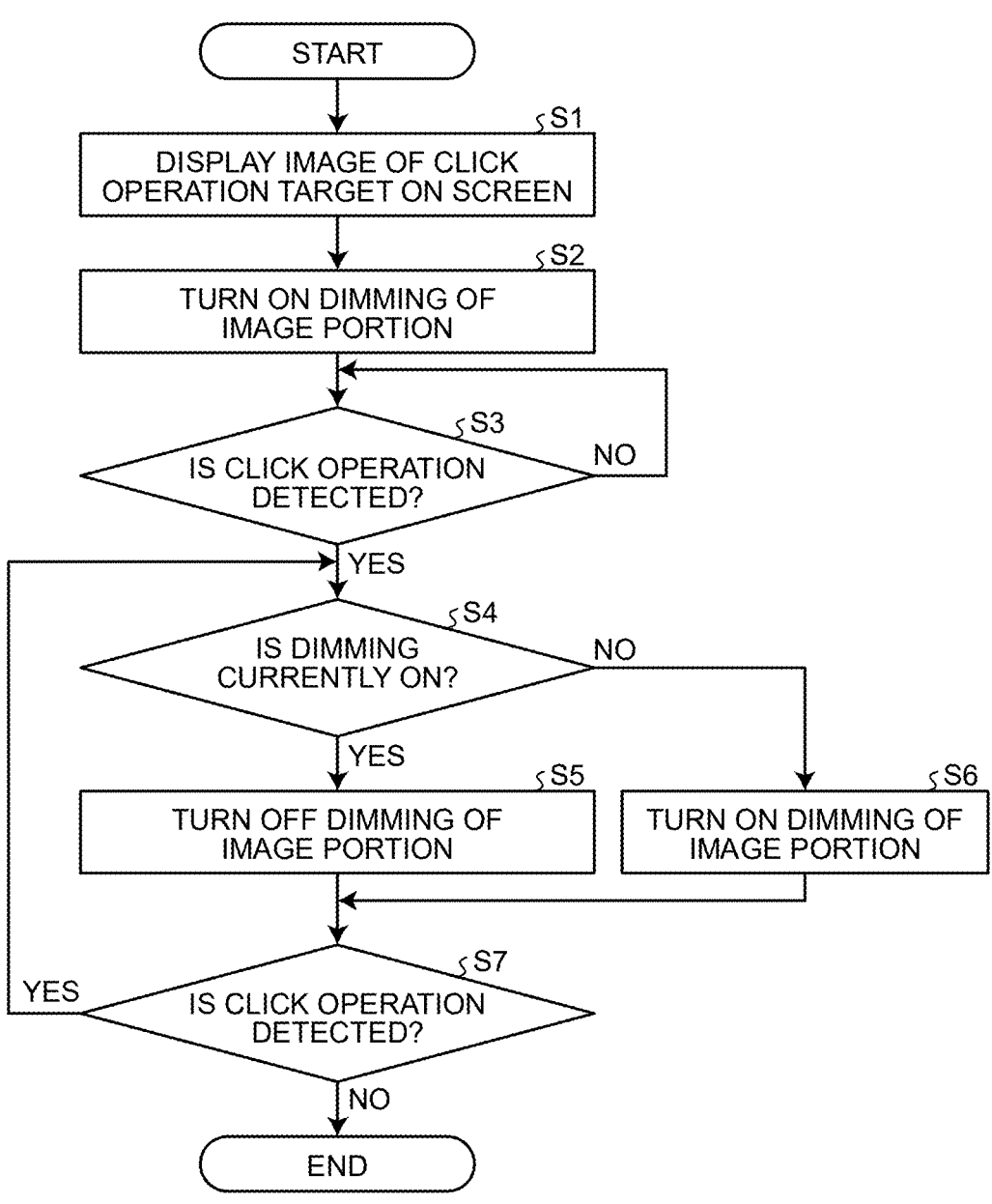
FIG. 4 is a flowchart illustrating an operation at the time of a click operation of the display system according to the embodiment.

For example, in response to the click operation from the user U, the display system 1 may operate as illustrated in FIG. 4. FIG. 4 is a flowchart illustrating an operation at the time of a click operation of the display system 1.

The display system 1 displays an image of a click operation target on a screen according to the request (S1). For example, the control device 2 generates a display control signal and supplies the display control signal to the display device 4 according to the request. The display device 4 displays an image in a region R1 of the transparent display 42 according to the display control signal.

Figure 5:
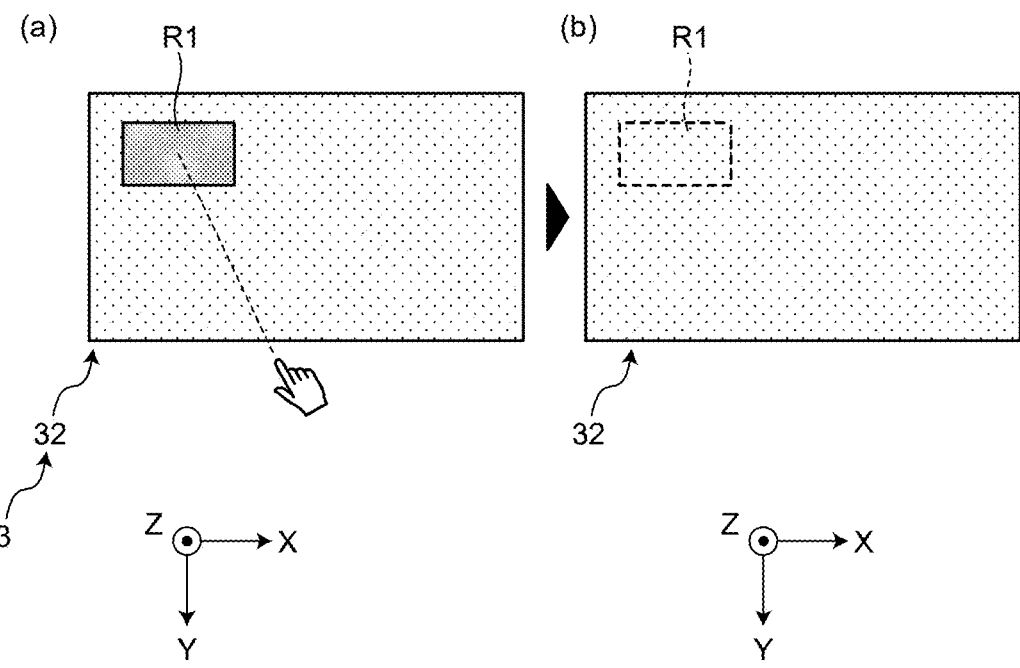
FIG. 5 is a view illustrating an operation at the time of a click operation of a dimming device according to the embodiment.

The display system 1 turns on dimming of an image portion in the dimming film 32 (S2). For example, the control device 2 generates a dimming control signal and supplies the dimming control signal to the dimming device 3 according to the request. As illustrated at (a) in FIG. 5, the dimming device 3 may set the region R1 in the dimming film 32 to the dimming on state according to the dimming control signal. FIG. 5 is a view illustrating an operation at the time of a click operation of the dimming device 3. In FIG. 5, a portion of the dimming film 32 corresponding to the region R1 of the transparent display 42 is referred to as the region R1 for the sake of convenience.

The display system 1 waits until the click operation is detected (No in S3). For example, the control device 2 analyzes the image of the hand of the user U, and can detect the click operation in a case where the region R1 of the transparent display 42 is located on the extension of the index finger of the user U as illustrated at (a) in FIG. 5. The detection of the click operation may be performed by another method. For example, the control device 2 may detect the click operation in a case where the region R1 of the transparent display 42 is located on the extension of the eyes and the index finger of the user U.

When detecting the click operation (Yes in S3), the display system 1 determines whether or not the click operation portion of the dimming device 3 is currently in the dimming on state (S4).

When the click operation portion of the dimming device 3 is in the dimming on state (Yes in S4), the display system 1 turns off the dimming of the image portion in the dimming film 32 (S5). For example, as illustrated at (a) in FIG. 5, when the region R1 of the dimming film 32 is in the dimming on state, the control device 2 sets the region R1 of the dimming film 32 to the dimming off state as illustrated at (b) in FIG. 5 in response to the click operation on the region R1 of the transparent display 42.

Figure 6:
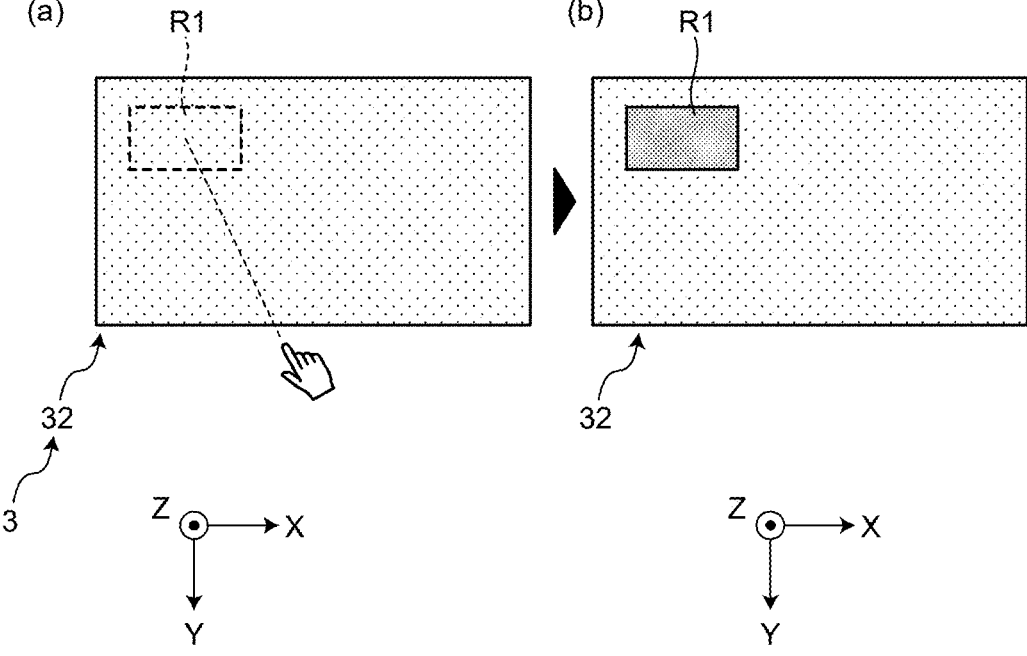
FIG. 6 is a view illustrating an operation at the time of a click operation of the dimming device according to the embodiment.

When the click operation portion of the dimming device 3 is not in the dimming on state (No in S4), the display system 1 turns on the dimming of the image portion in the dimming film 32 (S6). For example, as illustrated at (a) in FIG. 6, when the region R1 of the dimming film 32 is in the dimming off state, the control device 2 sets the region R1 of the dimming film 32 to the dimming on state as illustrated at (b) in FIG. 6 in response to the click operation on the region R1 of the transparent display 42.

Thereafter, when the click operation is detected (Yes in S7), the display system 1 returns the processing to S4, but when the click operation is not detected within a predetermined time (No in S7), the display system 1 ends the processing.

Figure 7:
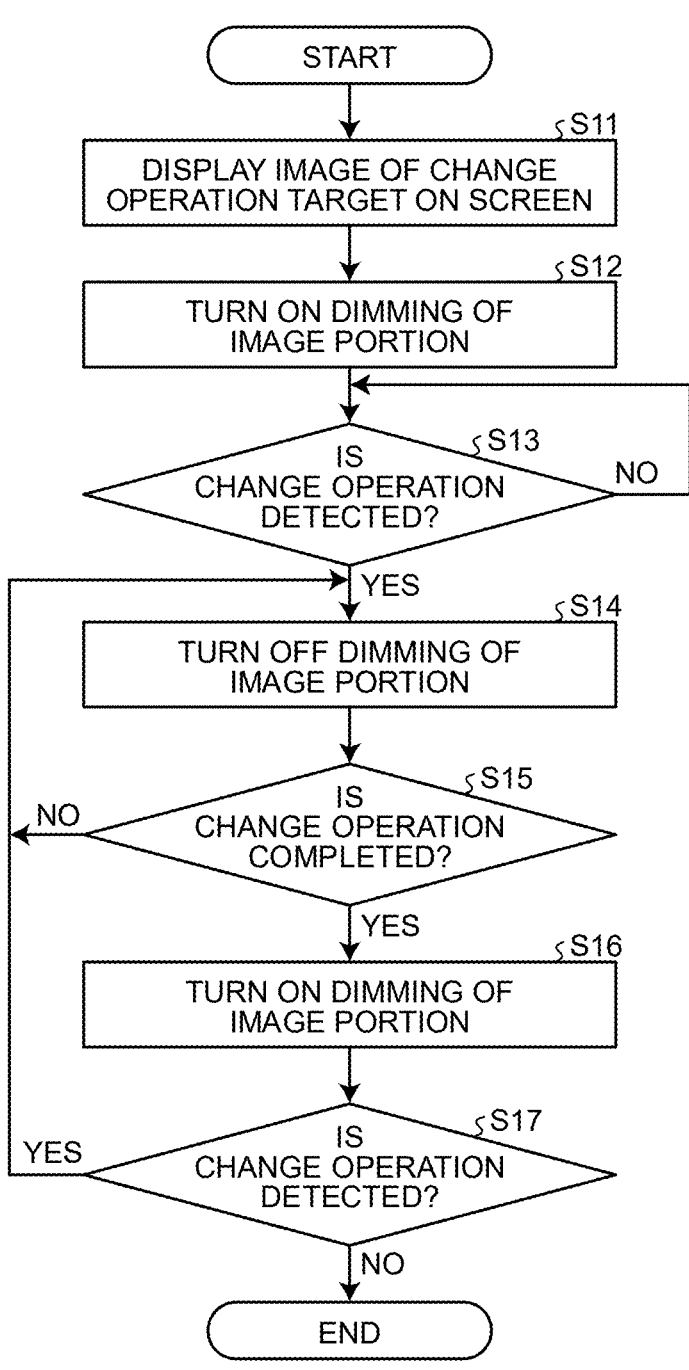
FIG. 7 is a flowchart illustrating an operation at the time of a change operation of the display system according to the embodiment.

In addition, in response to the change operation from the user U, the display system 1 may operate as illustrated in FIG. 7. FIG. 7 is a flowchart illustrating an operation at the time of a change operation of the display system 1.

The display system 1 displays an image of a change operation target on a screen according to the request (S11).

For example, the control device 2 generates a display control signal and supplies the display control signal to the display device 4 according to the request. The display device 4 displays an image in a region R11 (or regions R11a and R11b) of the transparent display 42 according to the display control signal.

The display system 1 turns on dimming of an image portion in the dimming film 32 of the dimming device 3 (S12). The dimming device 3 may set two or more grids corresponding to the image portion of the plurality of grids in the dimming film 32 to the dimming on state.

Figure 8:
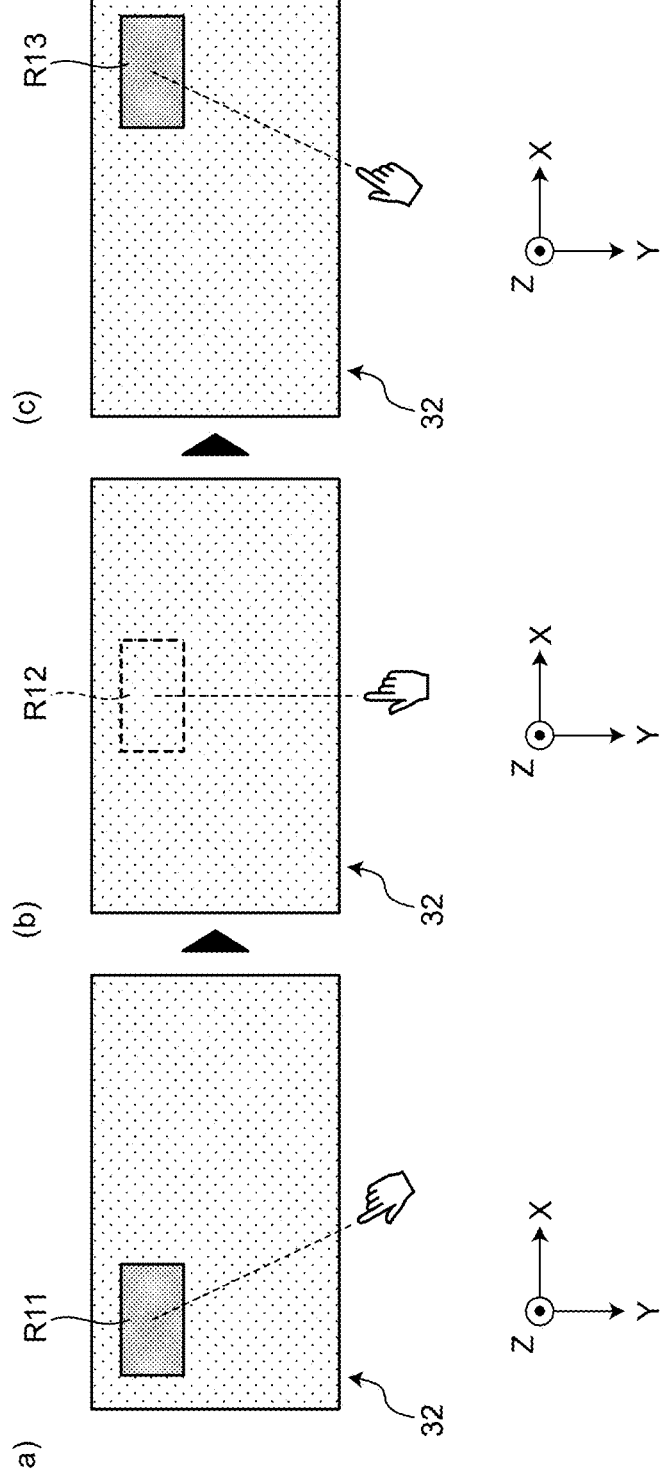
FIG. 8 is a view illustrating an operation at the time of a movement operation of the dimming device according to the embodiment.
Figure 9:
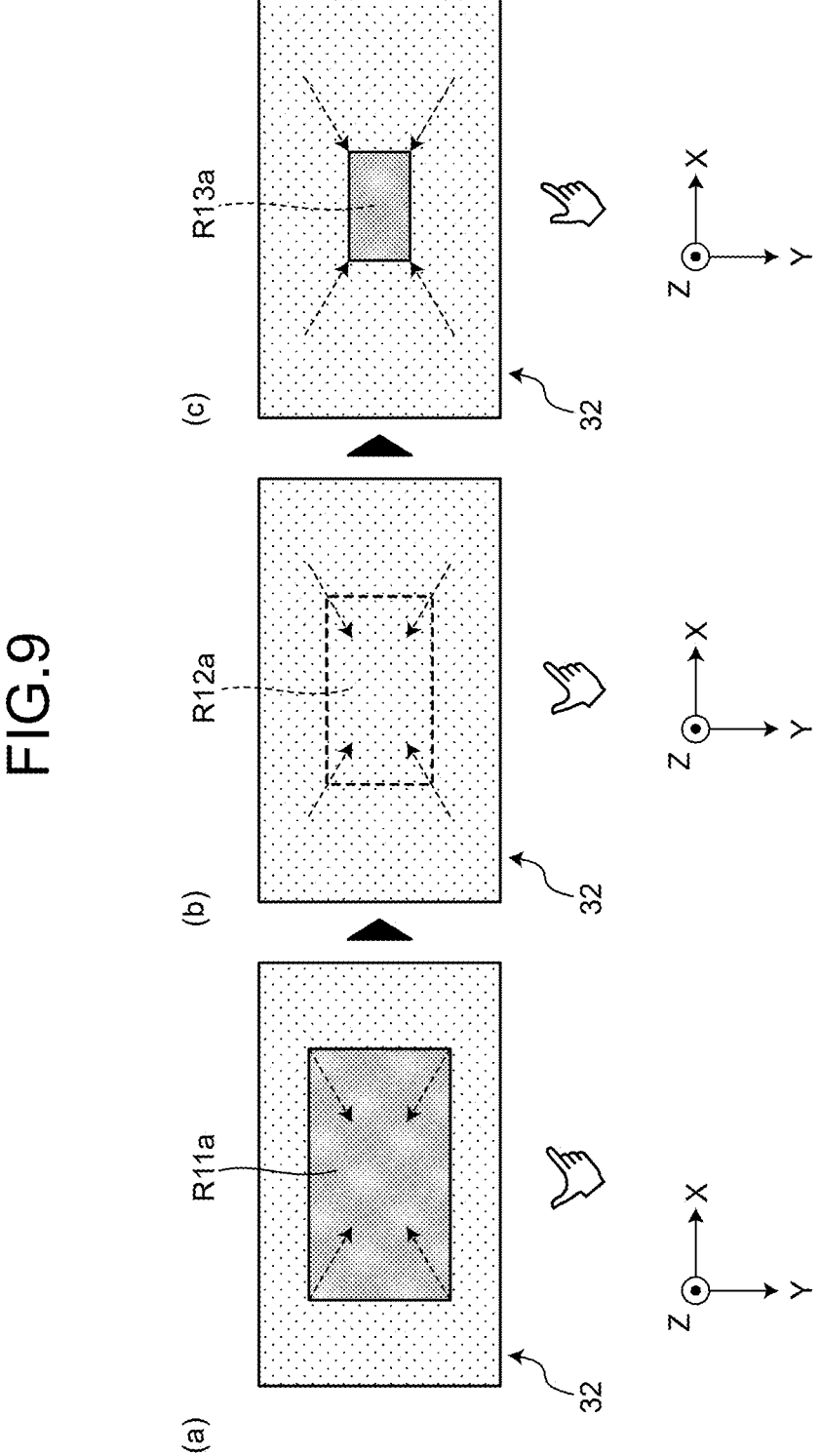
FIG. 9 is a view illustrating an operation at the time of an enlargement/shrinkage operation of the dimming device according to the embodiment.
Figure 10:
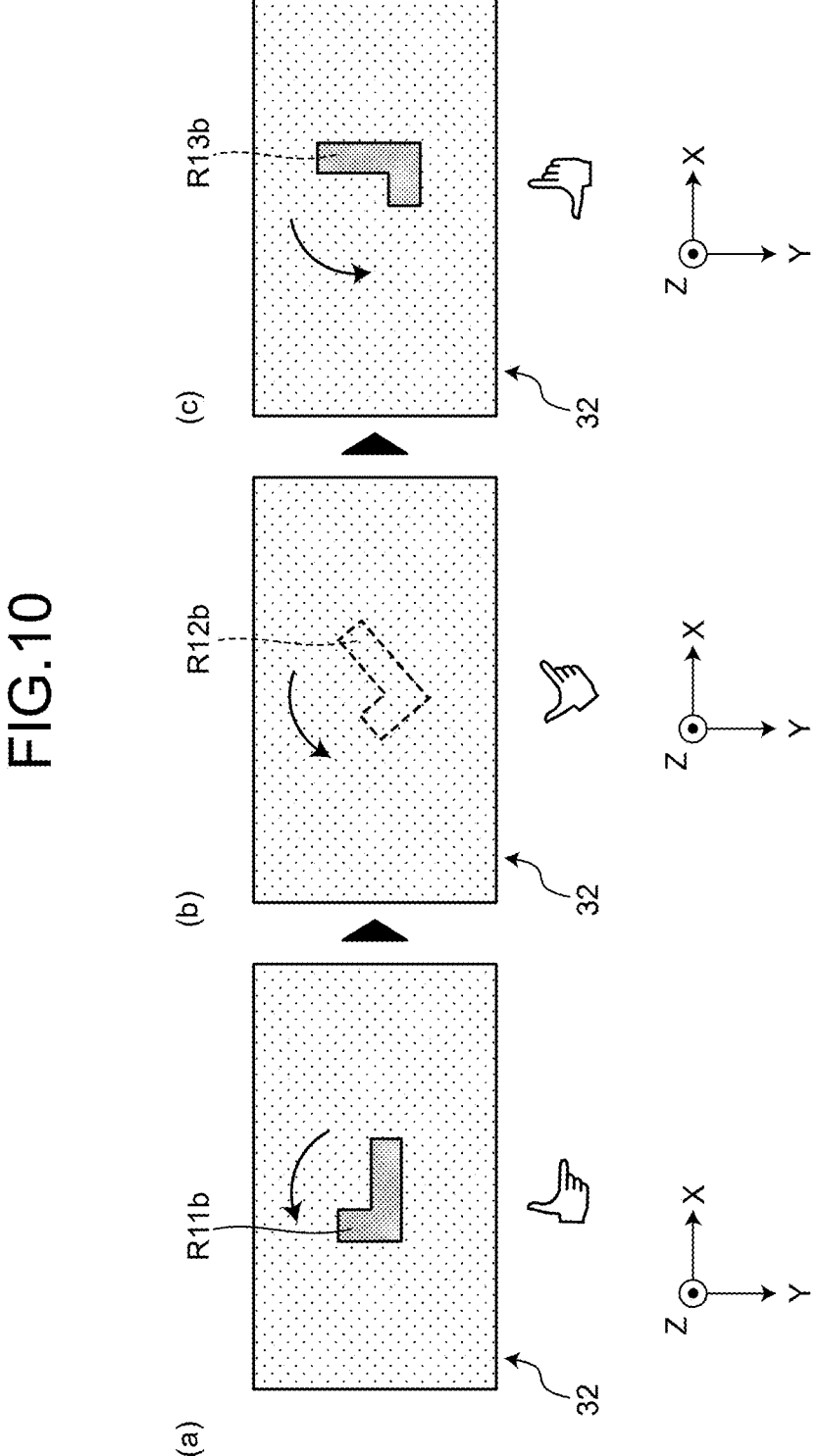
FIG. 10 is a view illustrating an operation at the time of a rotation operation of the dimming device according to the embodiment.

For example, the control device 2 generates a dimming control signal and supplies the dimming control signal to the dimming device 3 according to the request. As illustrated at (a) in FIG. 8, the dimming device 3 may set the region R11 in the dimming film 32 to the dimming on state according to the dimming control signal. That is, the dimming device 3 may set the two or more grids corresponding to the region R11 in the dimming film 32 to the dimming on state according to the dimming control signal. FIG. 8 is a view illustrating an operation at the time of a movement operation of the dimming device 3. In FIG. 8, a portion of the dimming film 32 corresponding to the region R11 of the transparent display 42 is referred to as the region R11 for the sake of convenience. Alternatively, as illustrated at (a) in FIG. 9, the dimming device 3 may set the region R11a in the dimming film 32 to the dimming on state according to the dimming control signal. FIG. 9 is a view illustrating an operation at the time of an enlargement/shrinkage operation of the dimming device 3. In FIG. 9, a portion of the dimming film 32 corresponding to the region R11a of the transparent display 42 is referred to as the region R11a for the sake of convenience. Alternatively, as illustrated at (a) in FIG. 10, the dimming device 3 may set the region R11b in the dimming film 32 to the dimming on state according to the dimming control signal. FIG. 10 is a view illustrating an operation at the time of a rotation operation of the dimming device 3. In FIG. 10, a portion of the dimming film 32 corresponding to the region R11b of the transparent display 42 is referred to as the region R11b for the sake of convenience.

The display system 1 waits until the change operation is detected (No in S13). For example, the control device 2 analyzes the image of the hand of the user U, and can detect the movement operation in a case where the region R1 of the transparent display 42 is located on the extension of the index finger of the user U as illustrated at (a) in FIG. 8. Alternatively, the control device 2 analyzes the image of the hand of the user U, and can detect the enlargement/shrinkage operation in a case where both ends of the region R11a of the transparent display 42 are located on the respective extensions of the thumb and the index finger of the user U as illustrated at (a) in FIG. 9. Alternatively, the control device 2 analyzes the image of the hand of the user U, and can detect the rotation operation in a case where two adjacent sides of the region R11b of the transparent display 42 are located parallel to the thumb and the index finger of the user U, respectively, as illustrated at (a) in FIG. 10. The movement operation, the enlargement/shrinkage operation, and the rotation operation may be detected by other methods. For example, the control device 2 may detect the enlargement operation when the user U moves two fingers away from each other in the central portion of the region R11a. For example, the control device 2 may detect the enlargement operation when the user U moves two fingers close to each other in the central portion of the region R11a.

When detecting the change operation (Yes in S13), the display system 1 sets the change operation portion in the dimming film 32 of the dimming device 3 to the dimming off state (S14). The dimming device 3 may set two or more grids in the dimming on state in the dimming film 32 to the dimming off state.

For example, as illustrated at (a) and (b) in FIG. 8, the control device 2 detects the movement operation according to a change of the extension of the index finger of the user U from the region R11 to a region R12. The region R12 has, for example, the same area/shape as those of the region R11, and is different in position from the region R11. In the case of (b) in FIG. 8, the region R12 is located on the +X side with respect to the region R11. In response to the movement operation, the control device 2 moves the image of the transparent display 42 from the region R11 to the region R12, and as illustrated at (b) in FIG. 8, sets the region R11 in the dimming film 32 to the dimming off state and maintains the region R12 in the dimming off state. That is, in response to the dimming control signal from the control device 2, the dimming device 3 sets the two or more grids corresponding to the region R11 in the dimming film 32 to the dimming off state, and maintains the two or more grids corresponding to the region R12 in the dimming off state.

Alternatively, the control device 2 detects the enlargement/shrinkage operation according to a change of the respective extensions of the thumb and the index finger of the user U from both ends of the region R11*a* to both ends of a region R12*a*. The region R12*a* is included in, for example, the region R11*a*, has the same shape as the region R11*a*, and has an area different from that of the region R11*a*. In the case of (b) in FIG. 9, the region R12*a* is smaller in area than the region R11*a*. In response to the enlargement/shrinkage operation, the control device 2 enlarges/shrinks the image of the transparent display 42 from the region R11*a* to the region R12*a*, and as illustrated at (b) in FIG. 9, sets the regions R11*a* and R12*a* in the dimming film 32 to the dimming off state. That is, in response to the dimming control signal from the control device 2, the dimming device 3 sets the two or more grids corresponding to the region R11*a* in the dimming film 32 to the dimming off state, and sets the two or more grids corresponding to the region R12*a* to the dimming off state.

Alternatively, the control device 2 detects the rotation operation in response to a change of the thumb and the index finger of the user U from the state of being parallel to two sides of the region R11*b* to the state of being parallel to two sides of a region R12*b*. The region R12*b* has, for example, the same area/shape as those of the region R11*b*, and is different in posture from the region R11*b*. In the case of (b) in FIG. 10, the region R12*b* is in a posture in which the region R11*b* is rotated at a positive angle about a Z axis. In response to the rotation operation, the control device 2 rotates the image of the transparent display 42 from the region R11*b* to the region R12*b*, and as illustrated at (b) in FIG. 10, sets the regions R11*b* and R12*b* in the dimming film 32 to the dimming off state. That is, in response to the dimming control signal from the control device 2, the dimming device 3 sets the two or more grids corresponding to the region R11*b* in the dimming film 32 to the dimming off state, and sets the two or more grids corresponding to the region R12*b* to the dimming off state.

The display system 1 maintains the change operation portion in the dimming film 32 in the dimming off state until the change operation is completed (No in S15), and when the change operation is completed (Yes in S15), the display system 1 turns on the dimming of the image portion in the dimming film 32 (S16). When the change operation is completed, the dimming device 3 sets the two or more grids corresponding to the image portion in the dimming off state in the dimming film 32 to the dimming on state according to the dimming control signal from the control device 2.

For example, as illustrated at (b) and (c) in FIG. 8, the control device 2 detects completion of the movement operation according to the fact that the extension of the index finger of the user U changes from the region R12 to a region R13 and does not change for a predetermined time in the region R13. The region R13 has, for example, the same area/shape as those of the region R12, and is different in position from the region R12. In the case (c) in FIG. 8, the region R13 is located on the +X side with respect to the region R12. As illustrated at (c) in FIG. 8, the control device 2 sets the region R13 in the dimming film 32 to the dimming on state according to the completion of the movement operation. That is, with the completion of the movement operation, the dimming device 3 sets the two or more grids corresponding to the region R13 in the dimming film 32 to the dimming on state according to the dimming control signal from the control device 2.

Alternatively, the control device 2 detects completion of the enlargement/shrinkage operation according to the fact that the respective extensions of the thumb and the index finger of the user U change from both ends of the region R12*a* to both ends of a region R13*a* and do not change for a predetermined time at both ends of the region R13*a*. The region R13*a* is included in, for example, the region R12*a*, has the same shape as the region R12*a*, and has an area different from that of the region R12*a*. In the case of (c) in FIG. 9, the region R13*a* is smaller in area than the region R12*a*. As illustrated at (c) in FIG. 9, the control device 2 sets the region R13*a* in the dimming film 32 to the dimming on state according to the completion of the enlargement/shrinkage operation. That is, with the completion of the enlargement/shrinkage operation, the dimming device 3 sets the two or more grids corresponding to the region R13 in the dimming film 32 to the dimming on state according to the dimming control signal from the control device 2.

Alternatively, the control device 2 detects completion of the rotation operation according to the fact that the thumb and the index finger of the user U change from the state of being parallel to two sides of the region R12*b* to the state of being parallel to two sides of a region R13*b* and do not change for a predetermined time in the state of being parallel to two sides of the region R13*b*. The region R13*b* has, for example, the same area/shape as those of the region R12*b*, and is different in posture from the region R12*b*. In the case of (c) in FIG. 10, the region R13*b* is in a posture in which the region R12*b* is rotated at a positive angle about a Z axis. As illustrated at (c) in FIG. 10, the control device 2 sets the region R13*b* in the dimming film 32 to the dimming on state according to the completion of the rotation operation. That is, with the completion of the rotation operation, the dimming device 3 sets the two or more grids corresponding to the region R13 in the dimming film 32 to the dimming on state according to the dimming control signal from the control device 2.

Thereafter, when the change operation is detected (Yes in S17), the display system 1 returns the processing to S14, but when the change operation is not detected within a predetermined time (No in S17), the display system 1 ends the processing.

As described above, in the embodiment, in a case where the image of the transparent display 42 and the pattern of the dimming on state in the dimming film 32 are changed according to the request, the display system 1 temporarily sets two or more grids in the dimming on state to the dimming off state in the middle of the change. As a result, the influence due to the difference in change characteristics between the transparent display 42 and the dimming film 32 can be made less noticeable, and the pattern of the dimming on state in units of grids can be naturally presented to the user without discomfort.

For example, in a case where the resolution of the dimming film 32 is different from the resolution of the transparent display 42, the image of the transparent display 42 changes alone in the middle of the change, so that the pattern of the dimming on state in units of grids can be naturally presented to the user without discomfort.

Alternatively, in a case where the response speed of the dimming film 32 is different from the response speed of transparent display 42, the image of the transparent display 42 changes alone in the middle of the change, so that the pattern of the dimming on state in units of grids can be naturally presented to the user without discomfort.

Note that, in the display system 1, when the image of the transparent display 42 and the pattern of the dimming on state in the dimming film 32 are changed, it is considered that a place where the influence due to the difference in change characteristics between the transparent display 42 and the dimming film 32 is noticeable is located in the vicinity of the outline of the image.

Figure 11:
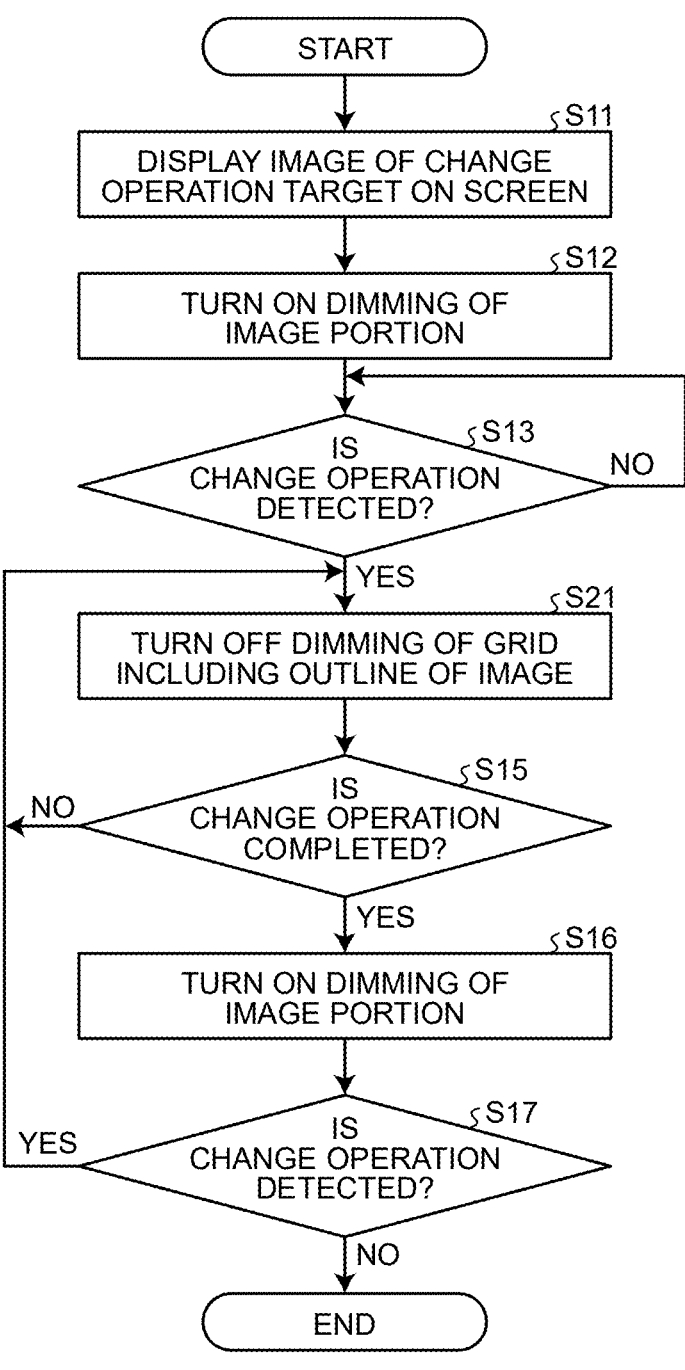
FIG. 11 is a flowchart illustrating an operation at the time of a change operation of a display system according to a first modification of the embodiment.

Based on such an idea, as a first modification of the embodiment, as illustrated in FIG. 11, the display system 1 may temporarily set some of the two or more grids in the dimming on state to the dimming off state. FIG. 11 is a flowchart illustrating an operation at the time of a change operation of the display system 1 according to a first modification of the embodiment.

After S11 to S12 are performed as in the embodiment, the display system 1 waits until the change operation is detected (No in S13), and when the change operation is detected (Yes in S13), the display system 1 turns off the dimming of a grid including the outline of the image (S21). The control device 2 identifies the outline of the image displayed on the transparent display 42 of the display device 4, and identifies the grids including the outline of the image among two or more grids in the dimming on state by the dimming film 32 of the dimming device 3. The control device 2 sets the grids including the outline of the image in the dimming film 32 of the dimming device 3 to the dimming off state.

Figure 12:
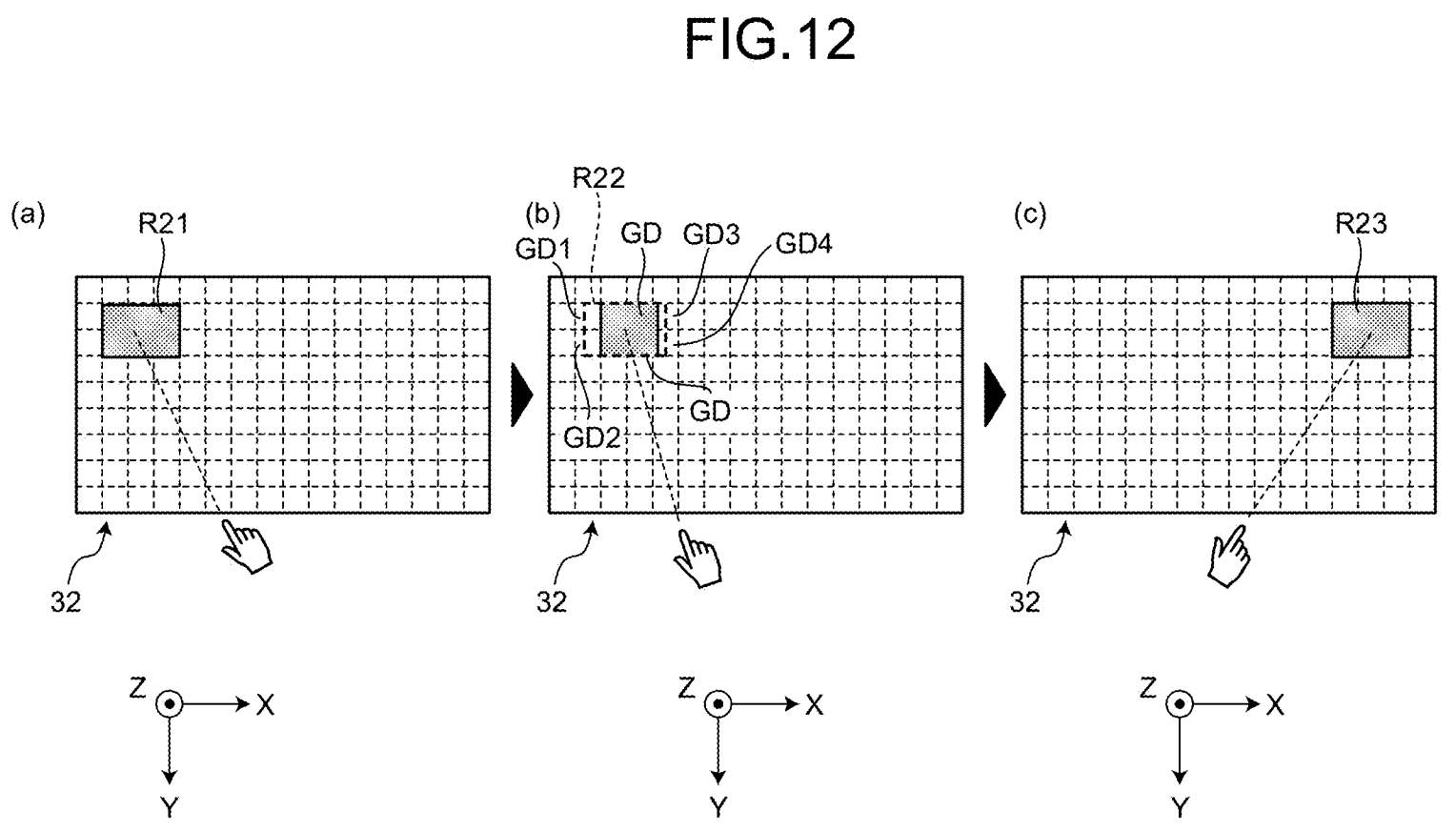

For example, as illustrated at (a) and (b) in FIG. 12, the control device 2 detects the movement operation according to a change of the extension of the index finger of the user U from a region R21 to a region R22. FIG. 12 is a view illustrating an operation at the time of a movement operation of a dimming device according to the first modification of the embodiment. The region R22 has, for example, the same area/shape as those of the region R21, and is different in position from the region R21. In the case of (b) in FIG. 12, the region R22 is located on the +X side with respect to region R21. In response to the movement operation, the control device 2 moves the image of the transparent display 42 from the region R21 to the region R22, and as illustrated at (b) in FIG. 12, sets grids GD1, GD2, GD3, and GD4 including the outline of the region R22 in the dimming film 32 to the dimming off state and maintains one or more grids GD completely included in the region R22 in the dimming on state. That is, in response to the dimming control signal from the control device 2, the dimming device 3 sets the two or more grids including the outline of the image in the dimming film 32 to the dimming off state, and maintains one or more grids included inside the image in the dimming on state.

Figure 13:
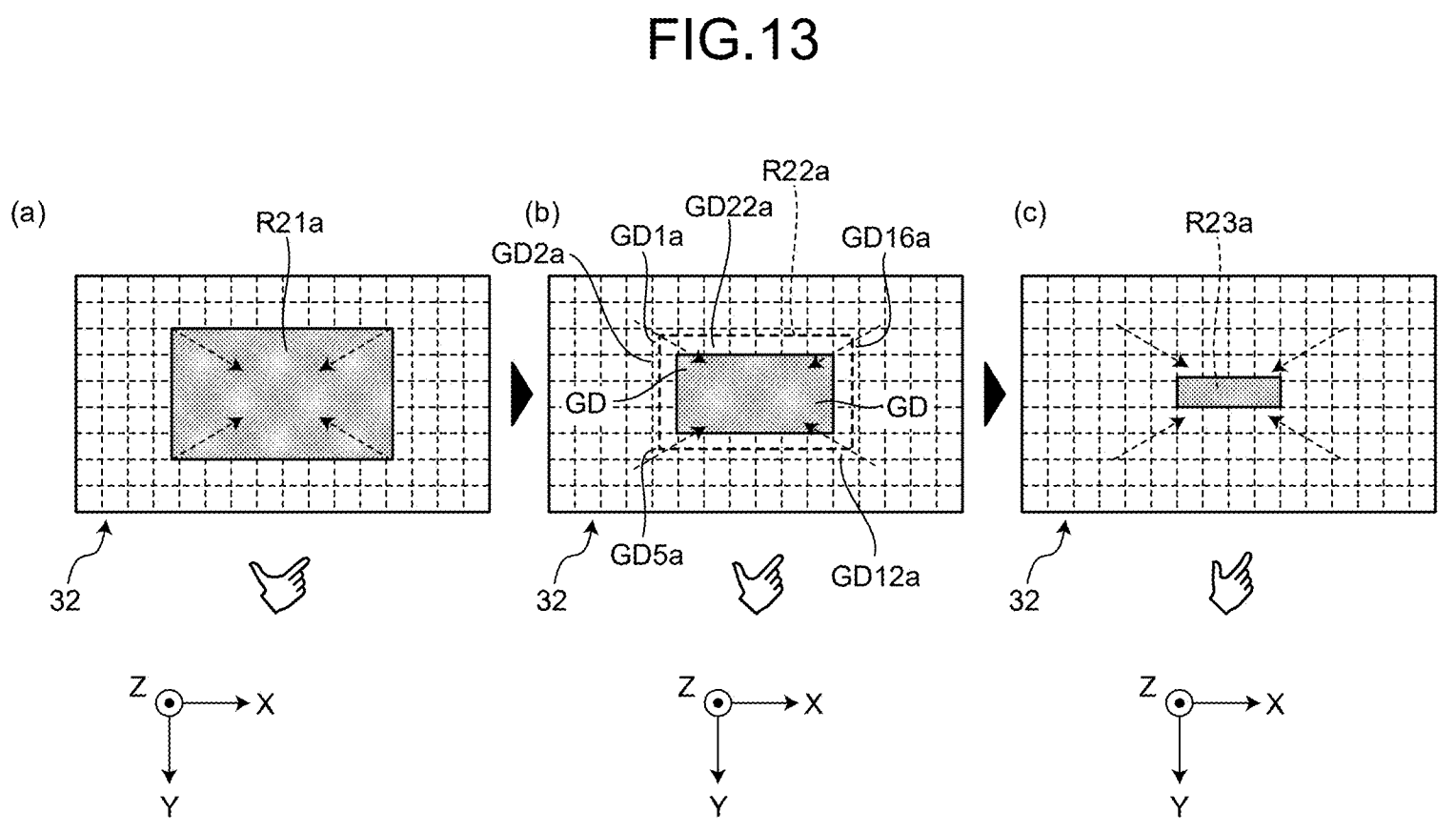

Alternatively, as illustrated at (a) and (b) in FIG. 13, the control device 2 detects the enlargement/shrinkage operation according to a change of the respective extensions of the thumb and the index finger of the user U from both ends of a region R21*a* to both ends of a region R22*a*. FIG. 13 is a view illustrating an operation at the time of an enlargement/shrinkage operation of the dimming device according to the first modification of the embodiment. The region R22*a* is included in, for example, the region R21*a*, has the same shape as the region R21*a*, and has an area different from that of the region R21*a*. In the case of (b) in FIG. 13, the region R22*a* is smaller in area than the region R21*a*. In response to the enlargement/shrinkage operation, the control device 2 enlarges/shrinks the image of the transparent display 42 from the region R21*a* to the region R22*a*, and as illustrated at (b) in FIG. 13, sets grids GD1*a*, GD2*a*, . . . GD5*a*, . . . GD12*a*, . . . GD16*a*, . . . GD22*a* including the outline of the region R22*a* in the dimming film 32 to the dimming off state and maintains one or more grids GD completely included in the region R22*a* in the dimming on state. That is, in response to the dimming control signal from the control device 2, the dimming device 3 sets the two or more grids including the outline of the image in the dimming film 32 to the dimming off state, and maintains one or more grids included inside the image in the dimming on state.

The display system 1 maintains the change operation portion in the dimming film 32 in the dimming off state until the change operation is completed (No in S15), and when the change operation is completed (Yes in S15), the display system 1 turns on the dimming of the image portion in the dimming film 32 (S16). When the change operation is completed, the dimming device 3 sets the two or more grids corresponding to the image portion in the dimming off state in the dimming film 32 to the dimming on state according to the dimming control signal from the control device 2.

For example, as illustrated at (b) and (c) in FIG. 12, the control device 2 detects completion of the movement operation according to the fact that the extension of the index finger of the user U changes from the region R22 to a region R23 and does not change for a predetermined time in the region R23. The region R23 has, for example, the same area/shape as those of the region R22, and is different in position from the region R22. In the case of (c) in FIG. 12, the region R23 is located on the +X side with respect to the region R22. As illustrated at (c) in FIG. 12, the control device 2 sets the region R23 in the dimming film 32 to the dimming on state according to the completion of the movement operation. That is, with the completion of the movement operation, the dimming device 3 sets the two or more grids corresponding to the region R23 in the dimming film 32 to the dimming on state according to the dimming control signal from the control device 2.

Alternatively, the control device 2 detects completion of the enlargement/shrinkage operation according to the fact that the respective extensions of the thumb and the index finger of the user U change from both ends of the region R22*a* to both ends of a region R23*a* and do not change for a predetermined time at both ends of the region R23*a*. The region R23*a* is included in, for example, the region R22*a*, has the same shape as the region R22*a*, and has an area different from that of the region R22*a*. In the case of (c) in FIG. 13, the region R23*a* is smaller in area than the region R22*a*. As illustrated at (c) in FIG. 13, the control device 2 sets the region R23*a* in the dimming film 32 to the dimming on state according to the completion of the enlargement/shrinkage operation. That is, with the completion of the enlargement/shrinkage operation, the dimming device 3 sets the two or more grids corresponding to the region R23 in the dimming film 32 to the dimming on state according to the dimming control signal from the control device 2.

Thereafter, S17 is performed as in the embodiment.

Also by such an operation of the display system 1, the influence due to the difference in change characteristics between the transparent display 42 and the dimming film 32 can be made less noticeable, and the pattern of the dimming on state in units of grids can be naturally presented to the user without discomfort.

Alternatively, in the display system 1, when the degree of freedom of control of the transparent display 42 is larger than that of the dimming film 32, it is expected that, in a case where the image of the transparent display 42 and the pattern of the dimming on state in the dimming film 32 are changed, by bringing the form of change of the transparent display 42 close to the form of change of the dimming film 32, the difference in change characteristics between the transparent display 42 and the dimming film 32 can be made less noticeable.

Figure 14:
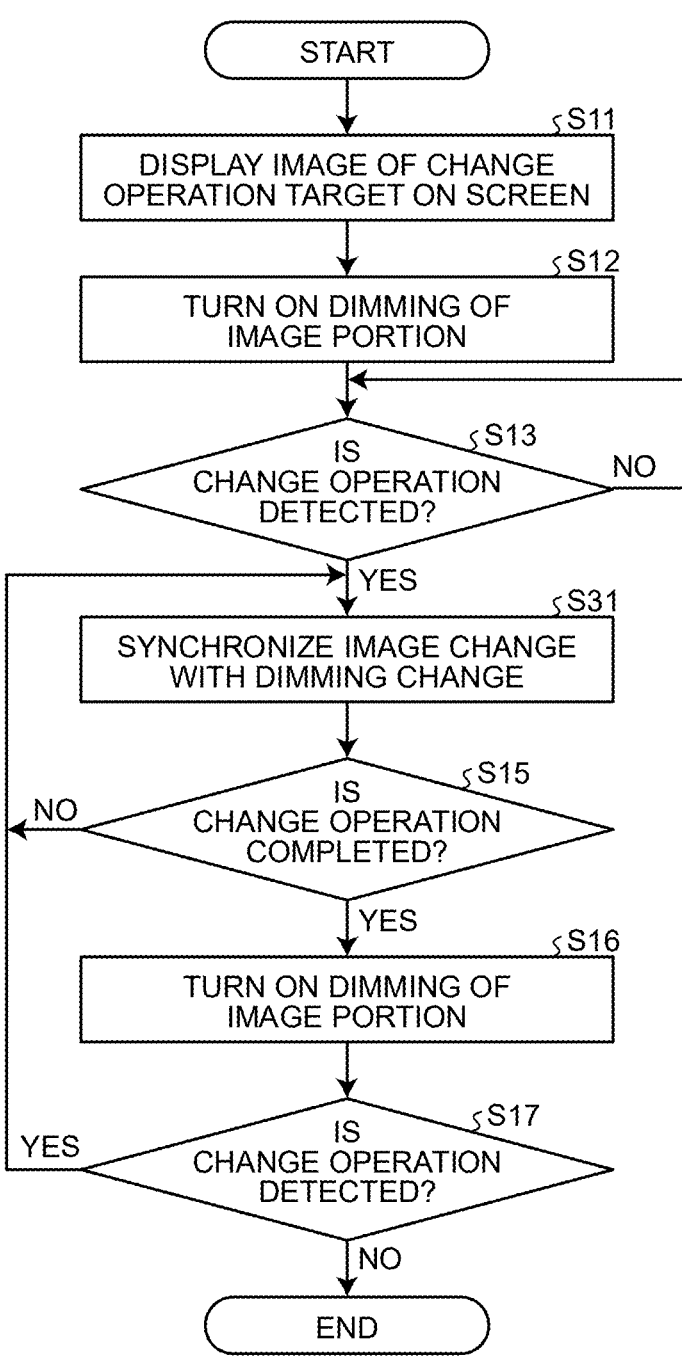
FIG. 14 is a flowchart illustrating an operation at the time of a change operation of a display system according to a second modification of the embodiment.

Based on such an idea, as a second modification of the embodiment, as illustrated in FIG. 14, the display system 1 changes the image of the transparent display 42 in synchronization with the change in the pattern of the dimming on state of the dimming film 32. FIG. 14 is a flowchart illustrating an operation at the time of a change operation of the display system 1 according to a second modification of the embodiment.

After S11 to S12 are performed as in the embodiment, the display system 1 waits until the change operation is detected (No in S13), and when the change operation is detected (Yes in S13), the display system 1 synchronizes the change of the image of the transparent display 42 with the change of the pattern of the dimming on state of the dimming film 32 (S31). The control device 2 identifies the form of change in two or more grids in the dimming on state in the dimming film 32 of the dimming device 3 accompanying the change operation. The control device 2 identifies the form of change in the image according to the form of change in two or more grids. The control device 2 generates a display control signal and supplies the display control signal to the display device 4 according to the form of change in the image.

Figure 15:
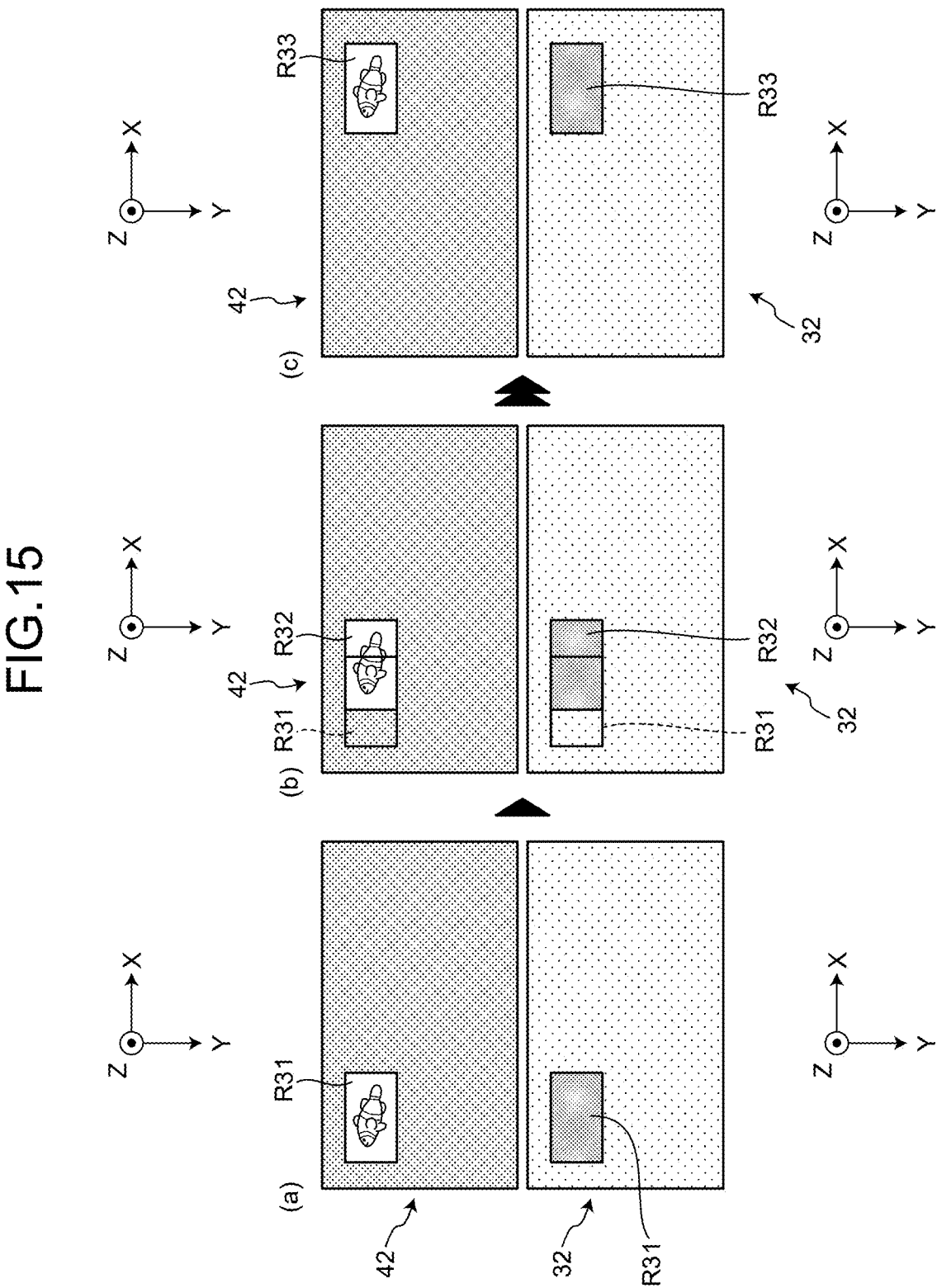
FIG. 15 is a view illustrating an operation at the time of a movement operation of the display system according to the second modification of the embodiment.

For example, the control device 2 detects the movement operation according to a change of the extension of the index finger of the user U from a region R31 to a region R32. The region R32 has, for example, the same area/shape as those of the region R31, is different in position from the region R31, and partially overlaps the region R31. In the case of (b) in FIG. 15, an end on the +X side of the region R32 is located on the +X side with respect to the region R31, and the region R32 partially overlaps the region R31. In response to the movement operation, as illustrated at (a) and (b) in FIG. 15, the control device 2 moves the image of the transparent display 42 from the region R31 to the region R32 in units of X widths of the grid, and moves the region to be set to the dimming off state in the dimming film 32 from the region R31 to the region R32. FIG. 15 is a view illustrating an operation at the time of a movement operation of the display system according to the second modification of the embodiment. That is, in response to the dimming control signal from the control device 2, the dimming device 3 sets the two or more grids corresponding to the region R31 in the dimming film 32 to the dimming off state, and maintains the two or more grids corresponding to the region R32 in the dimming off state.

The display system 1 maintains the change operation portion in the dimming film 32 in the dimming off state until the change operation is completed (No in S15), and when the change operation is completed (Yes in S15), the display system 1 turns on the dimming of the image portion in the dimming film 32 (S16). When the change operation is completed, the dimming device 3 sets the two or more grids corresponding to the image portion in the dimming off state in the dimming film 32 to the dimming on state according to the dimming control signal from the control device 2.

For example, as illustrated at (b) and (c) in FIG. 15, the control device 2 detects completion of the movement operation according to the fact that the extension of the index finger of the user U changes from the region R32 to a region R33 and does not change for a predetermined time in the region R33. The region R33 has, for example, the same area/shape as those of the region R32, and is different in position from the region R32. In the case of (c) in FIG. 15, the region R33 is located on the +X side with respect to the region R32. As illustrated at (b) in FIG. 15, the control device 2 sets the region R23 in the dimming film 32 to the dimming on state according to the completion of the movement operation. That is, with the completion of the movement operation, the dimming device 3 sets the two or more grids corresponding to the region R23 in the dimming film 32 to the dimming on state according to the dimming control signal from the control device 2.

Thereafter, S17 is performed as in the embodiment.

Also by such an operation of the display system 1, the influence due to the difference in change characteristics between the transparent display 42 and the dimming film 32 can be made less noticeable, and the pattern of the dimming on state in units of grids can be naturally presented to the user without discomfort.

Alternatively, the click operation may be used for on/off of selective dimming of the image on the transparent display 42 instead of being used for dimming on/off of the dimming film 32. The selective dimming is dimming for emphasizing a selected image among a plurality of images on the transparent display 42.

Figure 16:
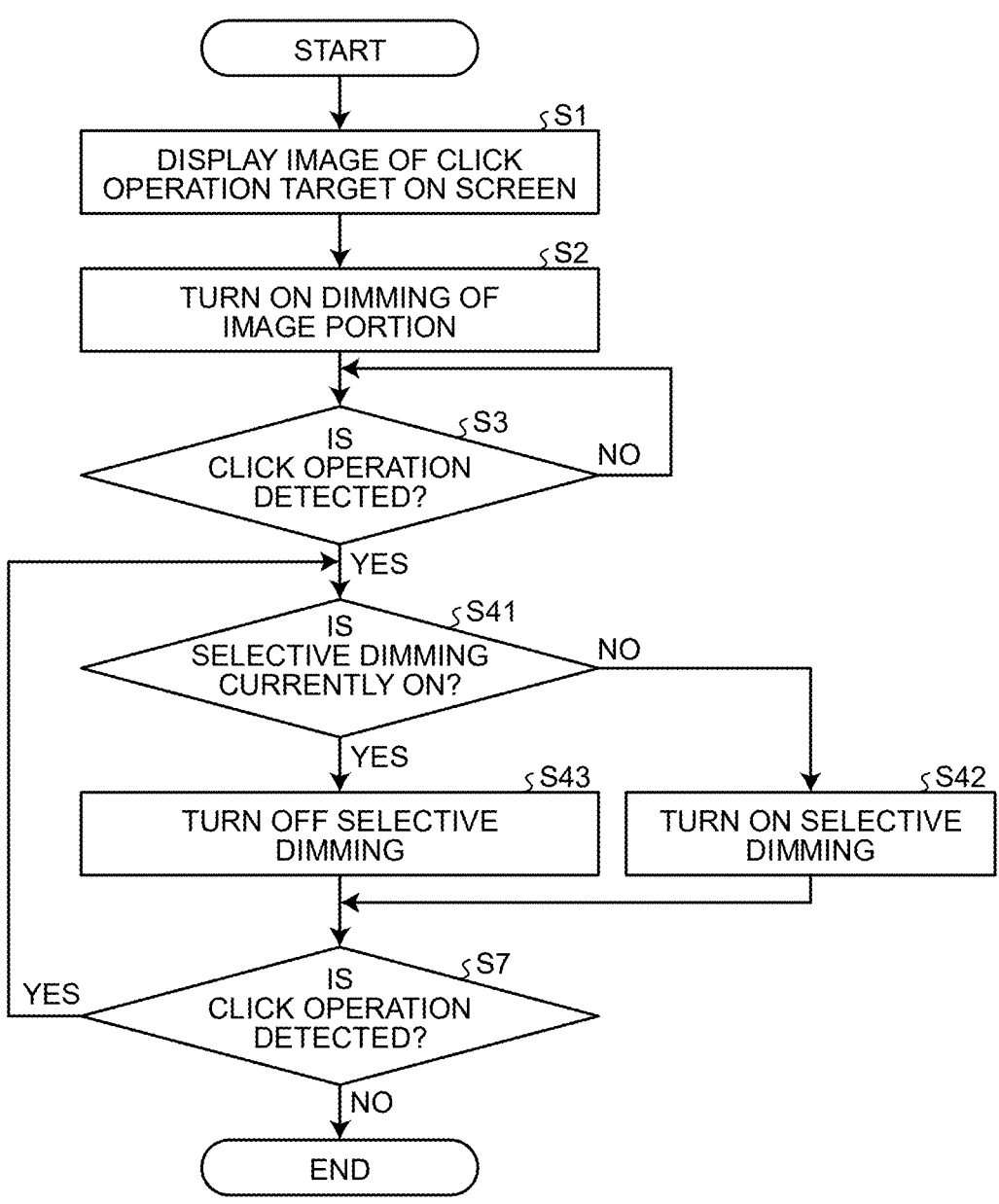
FIG. 16 is a flowchart illustrating an operation at the time of a click operation of a display system according to a third modification of the embodiment.

Based on such an idea, as a third modification of the embodiment, as illustrated in FIG. 16, the display system 1 may select/not select a plurality of images on the transparent display 42 according to the click operation. FIG. 16 is a flowchart illustrating an operation at the time of a change operation of the display system 1 according to a third modification of the embodiment.

After S1 to S2 are performed as in the embodiment, the display system 1 waits until the click operation is detected (No in S3), and when the click operation is detected (Yes in S3), the display system 1 determines whether the selective dimming is currently turned on (S41).

When the selective dimming is turned off (No in S41), the display system 1 turns on the selective dimming in response to the click operation (S42).

Figure 17:
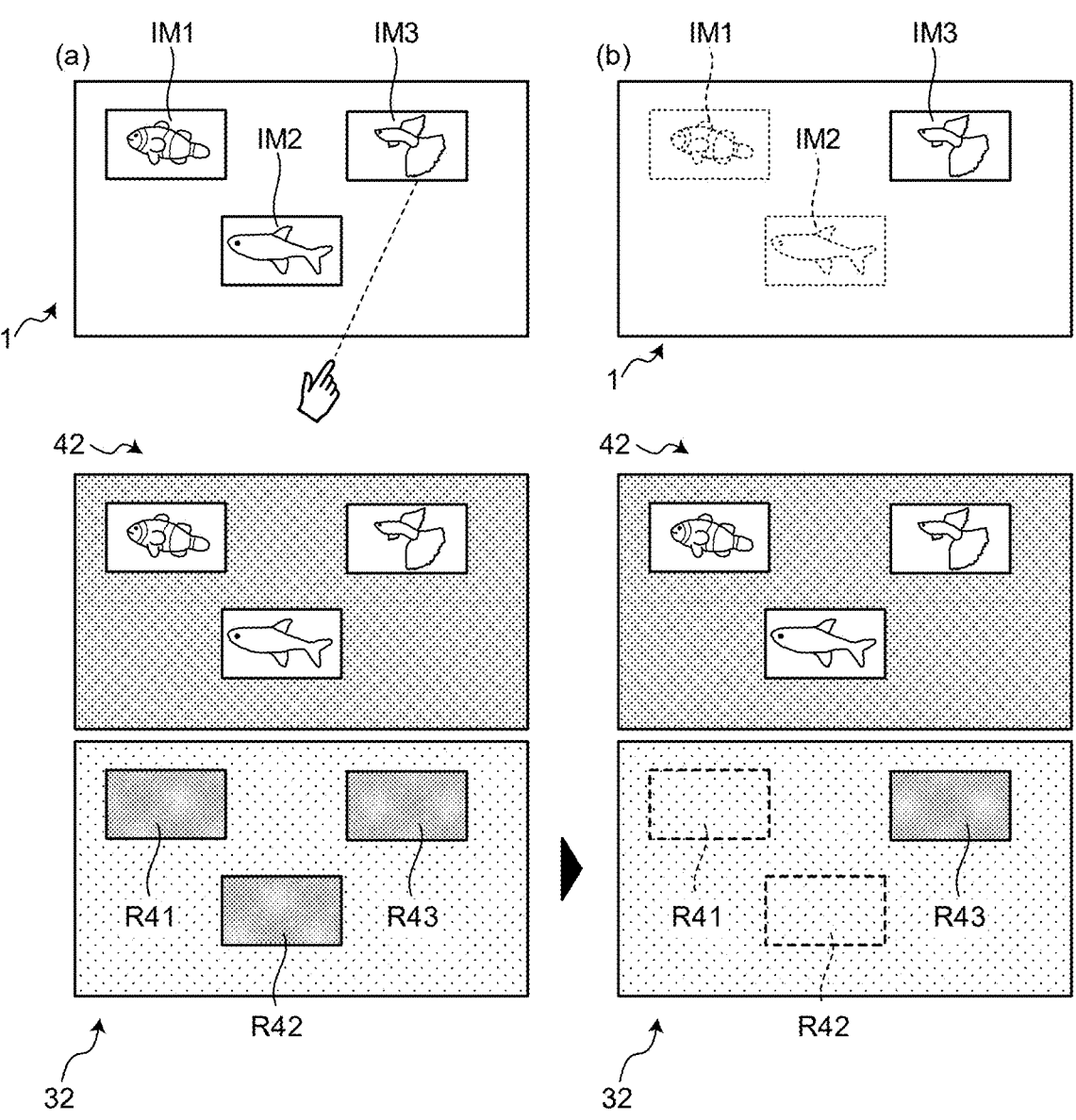
FIG. 17 is a view illustrating an operation at the time of a click operation of the display system according to the third modification of the embodiment.

For example, as illustrated at (a) in FIG. 17, in a case where an image IM3 is located on the extension of the index finger of the user U among a plurality of images IM1 to IM3 of the transparent display 42, the control device 2 maintains a region R43 corresponding to the image IM3 in the dimming on state as illustrated at (b) in FIG. 17. FIG. 17 is a view illustrating an operation at the time of a click operation of the display system according to the third modification of the embodiment. At this time, the control device 2 causes regions R41 and R42 corresponding to the other images IM1 and IM2 to transition from the dimming on state illustrated at (a) in FIG. 17 to the dimming off state illustrated at (b) in FIG. 17.

When the selective dimming is turned on (Yes in S41), the display system 1 turns off the selective dimming in response to the click operation (S43).

For example, as illustrated at (b) in FIG. 17, in a case where the region R43 corresponding to the image IM3 is in the selective dimming on state and the regions R41 and R42 corresponding to the other images IM1 and IM2 are in the dimming off state, the control device 2 causes the regions R41 and R42 to transition from the dimming off state illustrated at (b) in FIG. 17 to the dimming on state illustrated at (a) in FIG. 17. As a result, the control device 2 cancels (turns off) the selective dimming of the region R43 (S43), and returns the regions R41 to R42 of the dimming film 32 corresponding to the plurality of images IM1 to IM3 of the transparent display 42 to the state where dimming is turned on.

According to such an operation of the display system 1, it is possible to achieve selective dimming for emphasizing a selected image among a plurality of images of the transparent display 42.

With the dimming device according to the present disclosure, dimming can be appropriately performed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display system, comprising:
a dimming device including:
    a dimming film in which a plurality of grids are two-dimensionally arranged; and
    a controller configured to set two or more grids among the plurality of grids to a dimming on state, the two or more grids defining a region; and
a display that is disposed in front of the dimming device and parallel to the dimming film, wherein
each of the plurality of grids transmits an external light in a dimming off state, and attenuates the external light in the dimming on state,
the controller is configured to, when changing a pattern of the dimming on state according to a request by moving the region, temporarily set at least some grids partially included in the region, in a normal direction of the display, among the plurality of grids, to the dimming off state in a middle of the changing.

2. The display system according to claim 1, wherein the controller is configured to, when changing the pattern of the dimming on state according to the request, temporarily set the two or more grids to the dimming off state in the middle of the changing.

3. The display system according to claim 1, wherein each of the plurality of grids has a rectangular shape.

4. The display system according to claim 1, wherein the controller is configured to accept the request according to an operation of a user.

5. The display system according to claim 4, wherein the operation includes at least one of:
    a first operation to move the region occupied by the two or more grids;
    a second operation to change a size of the region while changing a number of grids set to the dimming on state; and
    a third operation to rotate the region.

6. The display system according to claim 4, wherein the operation is an aerial operation, and
the dimming device further comprises a camera that images the aerial operation.

7. The display system according to claim 1, wherein a resolution of the dimming film is lower than a resolution of the display.

8. The display system according to claim 1, wherein a response speed of the dimming film is lower than a response speed of the display.

9. A display system, comprising:
a dimming device that includes:
    a dimming film in which a plurality of grids are two-dimensionally arranged; and
    a controller configured to set two or more grids among the plurality of grids to a dimming on state, the two or more grids defining a region; and
a display that is disposed in front of the dimming device and parallel to the dimming film, is capable of displaying an image in the region, and moves the region in synchronization with a change in a pattern of the dimming on state so that at least a part of grids that are the dimming on state are included inside the region, when seen from a normal direction of the display, when the pattern of the dimming on state changes in the dimming device, wherein
each of the plurality of grids transmits an external light in the dimming off state, and attenuates the external light in the dimming on state.

10. A dimming method, comprising:
displaying a plurality of images on a display;
setting, to a dimming on state, two or more grids corresponding to the plurality of images among a plurality of grids in a dimming film disposed behind the display and parallel to the display, the plurality of grids being two-dimensionally arranged in the dimming film;
accepting a request to select one or more images among the plurality of images; and
setting a grid overlapping an unselected image, when seen from a normal direction to the display, among the two or more grids to a dimming off state according to the request, wherein
each of the plurality of grids transmits an external light in the dimming off state, and attenuates the external light in the dimming on state.

* * * * *